United States Patent
Piirainen

(10) Patent No.: US 6,192,238 B1
(45) Date of Patent: *Feb. 20, 2001

(54) RECEIVING METHOD AND RECEIVER

(75) Inventor: Olli Piirainen, Oulu (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/029,649
(22) PCT Filed: Aug. 28, 1996
(86) PCT No.: PCT/FI96/00461
§ 371 Date: Mar. 2, 1998
§ 102(e) Date: Mar. 2, 1998
(87) PCT Pub. No.: WO97/08841
PCT Pub. Date: Mar. 6, 1997

(30) Foreign Application Priority Data

Aug. 29, 1995 (FI) .................................................. 954053

(51) Int. Cl.⁷ ...................................................... H04Q 7/20
(52) U.S. Cl. ........................ 455/422; 455/67.1; 455/67.3
(58) Field of Search ..................................... 455/422, 513, 455/63, 67.3, 67.1, 67.6

(56) References Cited

U.S. PATENT DOCUMENTS 5,199,047   3/1993   Koch .
5,479,446   12/1995  Mourot .
5,533,067   7/1996   Jamal et al. .
5,563,746 * 10/1996  Bliss ........................................ 360/53
5,606,580   2/1997   Mourot et al. .
5,727,032   3/1998   Jamal et al. .
5,796,535 * 8/1998   Turtle et al. ............................ 360/51

FOREIGN PATENT DOCUMENTS 701 334   3/1996   (EP) .

OTHER PUBLICATIONS

IEEE Global Telecommunications Conference & Exhibition, Dallas, Texas, Nov. 27–30, 1989 pp. 1680–1686, J.Hagenauer et al.

William C.Y. Lee: Mobile Communications Engineering:, Chapter 10, Combining Technology, pp. 291–336, McGrae–Hill, USA, 1982.

* cited by examiner

Primary Examiner—Daniel S. Hunter
Assistant Examiner—Thuan T. Nguyen
(74) Attorney, Agent, or Firm—PIllsbury Madison & Sutro LLP

(57) ABSTRACT

The invention relates to a receiving method in a digital cellular radio system. The invention further relates to a receiver of the cellular radio network. In computing the signal to noise ratio, a reference signal is utilized which is the convolution of the estimated impulse response of a channel and the predetermined sequence. The signal to noise ratio is obtained as a ratio between the variance of the reference signal and the predetermined sequence received from the channel. The signal to noise ratio is used for weighing the diversity branches of the diversity receiver.

13 Claims, 3 Drawing Sheets

RECEIVING METHOD AND RECEIVER

Figure 1:
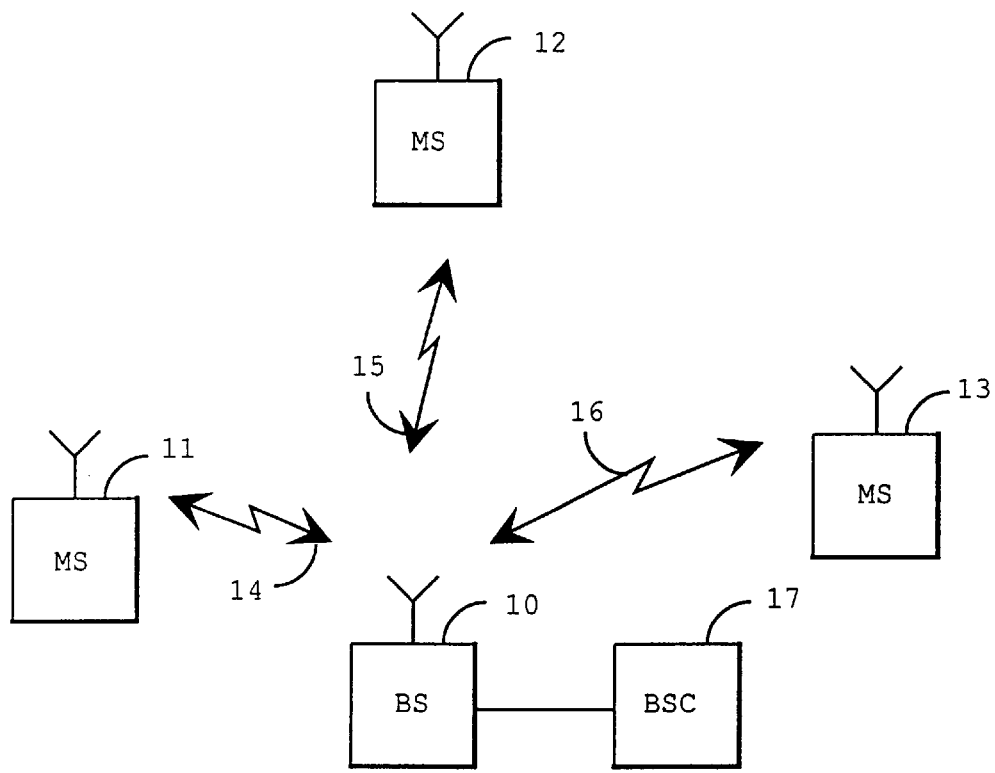

The present invention relates to a receiving method for a receiver of a digital cellular radio system, the receiver employing Viterbi detection and diversity reception, the method involving forming an estimated impulse response of a channel, and the estimated impulse response of the channel as well as the predetermined sequence comprised in the signal being symbol sequences.

The invention further relates to a receiver of a digital radio system, the receiver comprising a Viterbi detection means, diversity branches and a means for forming an estimated impulse response of the channel.

In a cellular radio system, the quality of the connection between a base station and a subscriber terminal equipment constantly varies. The variation results from disturbance present on the radio path and the attenuation of radio waves as a function of distance and time in the channel fading out. The connection quality can be measured for example by monitoring the strength level received. In order to partly compensate for the quality variations of the connection, power control can be used.

Digital cellular radio systems require a more accurate method for estimating the connection quality. Known quality parameters employed include, for example, bit error rate BER and signal to noise ratio SNR.

It is known to utilize the decisions of the Viterbi detection in estimating the SNR of the signal received. As a receiver, either a base station or a subscriber terminal equipment may be used. In prior art solutions, the Viterbi detection is completely performed for the burst received prior to determining the SNR. Due to the Viterbi algorithm often being too demanding a task for a digital signal processing program within processing time allowed by the receiver, separate Viterbi hardware has to be used. This is described in greater detail in J. Hagenauer, P. Hoeher: A Viterbi Algorithm with Soft-decision Outputs and its Applications, IEEE GLOBECOM 1989, Dallas, Tex., November 1989, which is incorporated herein as reference. Computing SNR on the basis of the differences between the signal received and the estimated signal calculated on the basis of the channel estimate are also dealt with in the European Patent 428199, which is also incorporated herein as reference.

It is well known that the SNR information, which is simple to compute by the method according to the invention, is required when using various kinds of diversity receivers. In diversity reception, the most typical diversity receivers combine the signals prior to or following the detection, and they comprise for example Selective combining, Maximal-ratio combining, and Equal-gain combining. The diversity signals are normally detected by using the Viterbi detection, whereby the signal combining takes place after the detection. However, the most advantageous way is to combine the signals prior to the detection because this results in a higher signal gain. A closer description on diversity receivers is given for example in William C. Y. Lee: Mobile Communications Engineering, Chapter 10, Combining Technology, pp. 291–336, McGraw-Hill, USA, 1982, which is incorporated herein as reference.

The present invention aims at realizing a method by means of which the SNR can be estimated directly from the signal received without employing the Viterbi detection, thus making it possible to combine the signals when using diversity receivers.

This object is achieved by a method set forth in the introduction, characterized by the steps of forming a reference signal from the estimated impulse response of the channel and the predetermined sequence within the signal, computing as a variance type computation the energy of noise associated with the signal from the reference signal and the predetermined sequence received from the channel, computing the SNR as a ratio between the reference signal energy and the noise energy, and combining the diversity branch symbols which temporally correspond with one another, and weighting the outputs of the adapted filters in each branch and the autocorrelation taps in the impulse response by the SNR of each branch.

The receiver according to the invention is characterized in that, in order to compute the SNR, the receiver comprises a means used for forming the reference signal from the estimated impulse response of the channel and the predetermined sequence within the signal, a means for computing the channel noise energy from the reference signal and the received predetermined sequence as a variance type computation, a means for computing the SNR as a ratio between the reference signal energy and the energy of the noise, and diversity branches combining means which combine the temporally corresponding symbols of the different branches, and a means for weighting the outputs of the adapted filters in each branch and the autocorrelation taps in the impulse response by the SNR of each branch.

The invention provides several advantages. By means of the method according to the invention the SNR can be estimated directly from the signal received without carrying out the Viterbi detection, or by implementing the method of the invention prior to the Viterbi detection by utilizing the predetermined sequence within the burst. The invention has two main stages: the first stage is the forming of the reference signal and the second stage is the computing of the variance, i.e. the noise energy, between the signal received and the reference signal. The reference signal will be obtained upon computing the convolution of the channel estimated impulse response, obtained by means of the predetermined sequence, and the predetermined sequence. The estimated noise energy is computed as a variance, or a function resembling variance, from the reference signal and the sequence received. The signal energy is obtained either from the energy of the taps in the channel estimated impulse response or by computing the energy of the samples, i.e. symbols, of the reference signal. By dividing a signal thus formed by noise, an estimated momentary SNR of the channel will be obtained.

By avoiding the use of the Viterbi algorithm, memory capacity and time consumed in the computing process will be saved. The value of the SNR thus obtained can be utilized in estimating the conditions on the channel, as an aid in bad frame estimation methods and for scaling in ML (maximum likelihood) metrics. In addition, the SNR can be utilized in diversity combining, and it is particularly practicable is cases the diversity signals are combined prior to the detection.

The preferred embodiments of the method according to the invention are also set forth in the attached dependent claims 2–9, and the preferred embodiments of the receiver according to the invention are set forth in the attached dependent claims 11–13.

Figure 2:
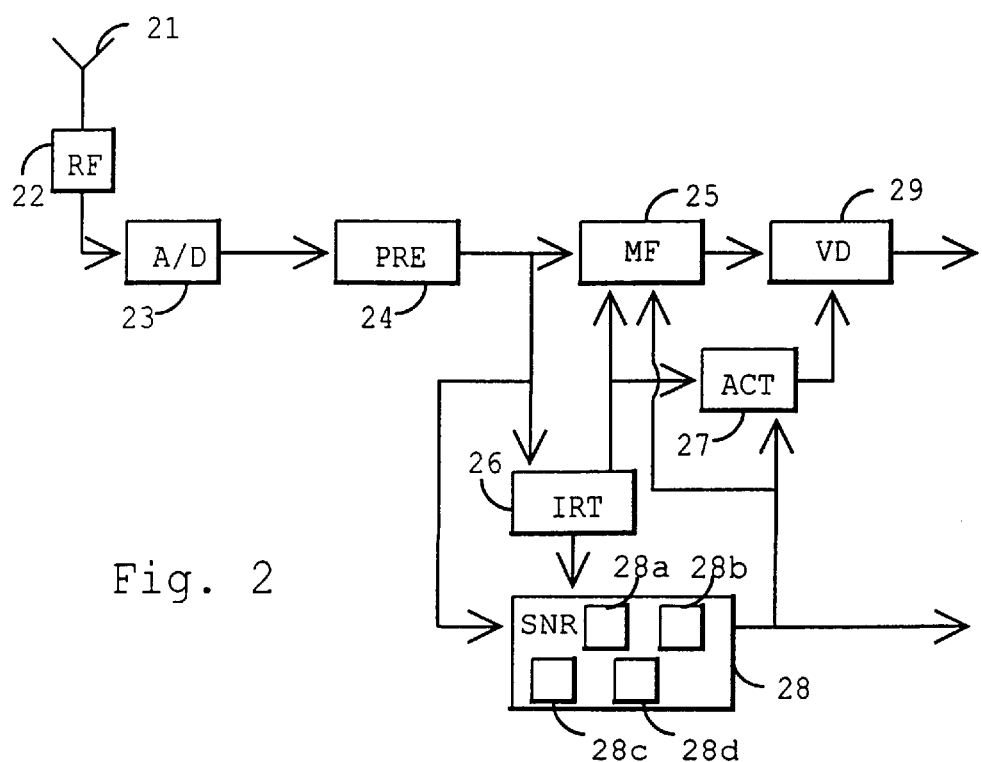
Figure 3:
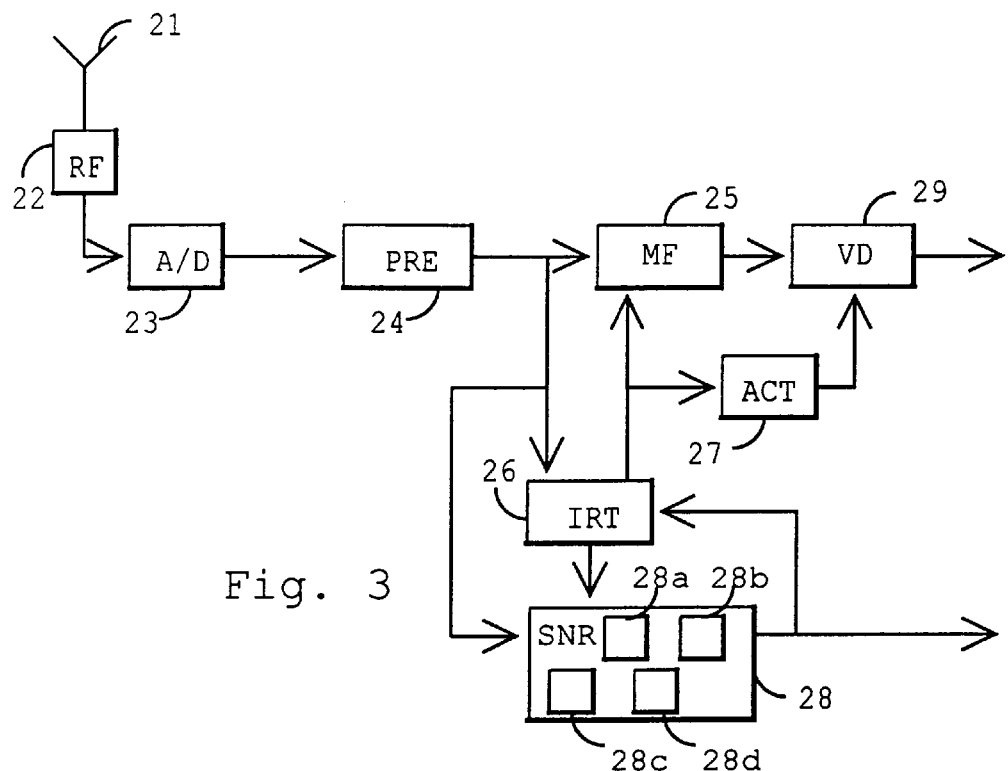
Figure 4:
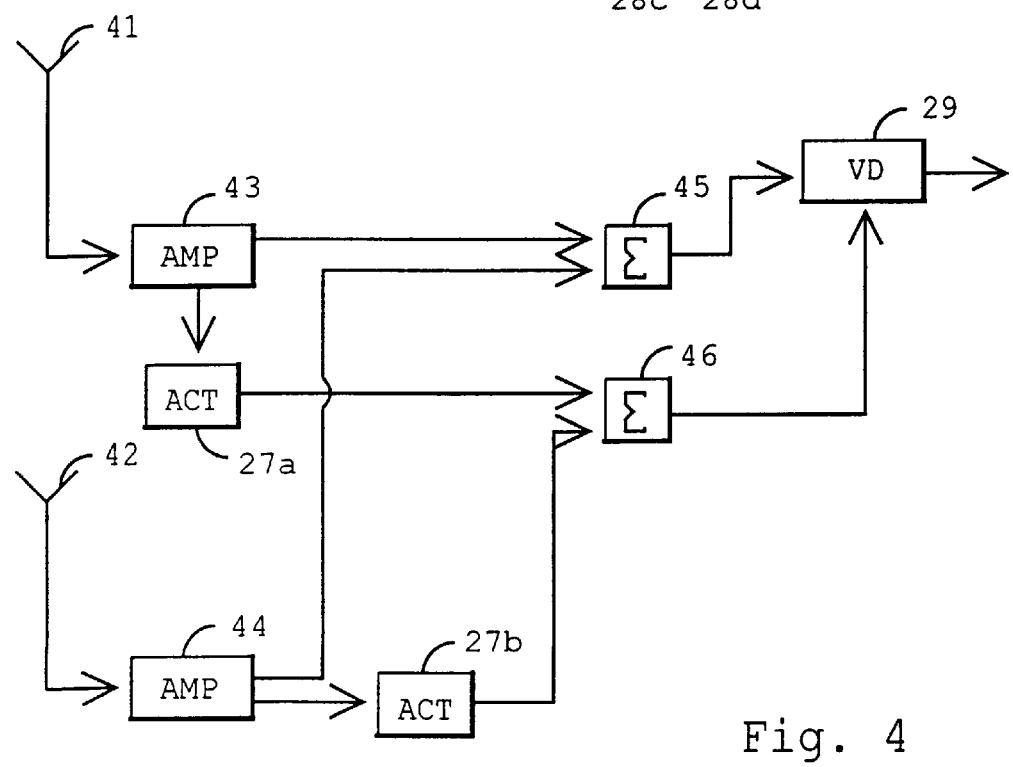
Figure 5:
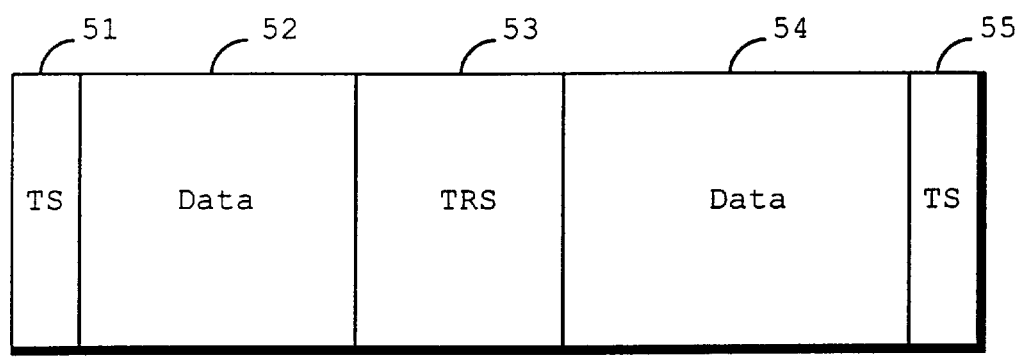

In the following, the invention will be described in greater detail with reference to the examples in the accompanying drawings, in which FIG. 1 illustrates a cellular radio system in which the method according to the invention can be applied, FIG. 2 illustrates the essential parts of a receiver according to the GSM system, FIG. 3 illustrates another implementation of the essential parts of a receiver according to the GSM system, FIG. 4 illustrates a receiver according to the GSM system, the receiver utilizing a diversity combining technique, and FIG. 5 illustrates a normal burst in the GSM system.

The method and receiver according to the invention are applicable to any digital cellular radio system whose essential parts are shown in FIG. 1. The system comprises a base station 10, and a plurality of usually mobile subscriber terminal equipments 11–13 which have a duplex connection 14–16 to the base station. The base station 10 forwards the connections of the terminal equipments 11–13 to a base station controller 17 which forwards them further to other parts of the system and to the fixed network. The base station controller 17 controls the operation of one or more base stations 10. In the GSM system, both the base station 10 and the terminal equipments 11–13 continuously measure the quality of the connection and convey the results to the base station controller 17. In the embodiment according to the invention, the measurement of the connection quality is carried out as an SNR measurement.

The following will describe in greater detail the receiver according to the invention in a cellular radio system, the essential parts of such a receiver being illustrated in block diagram form in FIG. 2. Both the base station and the subscriber terminal equipment may function as the receiver of the invention. The receiver comprises an antenna 21 which receives a signal to be applied to radio frequency parts 22 in which the signal is transformed to an intermediate frequency. From the radio frequency parts, the signal is fed to a converter means 23 which converts the signal from analog to digital. The digital signal proceeds to a preprocessing means 24 in which it is possible, among other things, to filter the signal, delete DC offset from it, to control automatic amplification of the digital signal, and to demodulate the signal. A filter 25 arranged in the channel restores a signal distorted on the channel to the original data stream with a low symbol error probability. The estimate of the impulse response of the channel and its energy are formed by a means 26. On the basis of the impulse response information, the autocorrelation taps of the channel estimated impulse response are formed in a means 27.

In a digital system, the impulse response of the channel is depicted with a character having N symbols. Usually, the channel impulse response has five symbols, i.e. N obtains the value 5. The SNR is computed in the method of the invention with a means 28, which comprises means 28a, 28b and 28c. The means 28a is used for forming the reference signal from the estimated impulse response of the channel and the predetermined sequence within the signal. The means 28b computes the energy of the noise on the channel from the reference signal and the predetermined sequence received. The means 28c computes the SNR as a ratio between the reference signal and the noise energy. The means 28d is used for correcting the offset between the reference signal and the predetermined sequence, the term offset referring to the symbols shifting in time with regard to one another. Finally, the Viterbi detection means 29 in the receiver receives the different sequences 52, 53 and 54, i.e. the sequences of the received burst from the output of the adapted filter, such sequences being illustrated in FIG. 5, as well as the autocorrelation taps of the impulse response from the means 27. According to the present receiver solution, the SNR information is transferred both to the means 27, used for forming the autocorrelation taps of the impulse response, and to the adapted filter 25. The SNR information can also be sent to the other means. As an output from the Viterbi detection means 29, detected symbols are obtained.

The following will describe in greater detail a second receiver, an alternative to the first receiver of the cellular radio system, the essential parts of the block diagram of such a second receiver being shown in FIG. 3. For the most part, the receiver is similar to the one shown in FIG. 2. In this receiver solution, the SNR information is transferred from the SNR computing means 28 to the means 26 which forms the taps of the impulse response. The SNR information may also be applied to the other means. As outputs of the Viterbi detection means 29, detected symbols are obtained. The SNR information may also be conveyed to the other means as well, which is illustrated by an arrow 30 pointing away from the means 28 in FIGS. 2 and 3.

The solutions illustrated in FIGS. 2 and 3 can advantageously be utilized in diversity reception, such an arrangement being shown in FIG. 4 with the receiver employing diversity combining. The receiver in FIG. 4 comprises antennas 41 and 42, means 43, 44 which in turn include the radio frequency parts 22, the conversion means 23, the preprocessing means 24, the adapted filters 25, the estimating means 26 for the channel impulse response, the SNR computing means 28 such as the receivers of FIGS. 2 and 3. Although there are only 2 branches, i.e. channels, in FIG. 4, similar diversity combining can be applied to a larger number of channels as well. The autocorrelation taps of the estimated impulse responses for the different channels are formed by the means 27a and 27b, which serve the same purpose as the means 27 in FIGS. 2 and 3. The signals received from the different channels are combined with the means 45, in which the summing takes place by either summing or averaging, and, if desired, by multiplying the signals by a suitable constant. Hence, the signal is weighted by the SNR, or the signal for the detector is chosen on the basis of the SNR information. After the combining, the signal is applied to the Viterbi detection means 29. The outputs of the means 27a and 27b forming the autocorrelation taps of the impulse response are also combined by the means 46 for example by summing or averaging and, if desired, multiplying the outputs by a suitable constant. When combining the diversity branches and the autocorrelation taps it is advantageous to combine only symbols or bits that temporally correspond with one another. The output of the means 46 is also applied to the Viterbi detection means 29. Such a solution is particularly usable because combining the signals prior to the detection results in a higher gain for the signal.

In the following, the solution according to the invention will be described in closer detail in connection with the GSM system. A normal burst in the GSM system is shown in FIG. 5, comprising 148 symbols in all. The symbols contain bits or combinations of bits. The symbols of the burst appear in sequences comprising 3 start symbols (TS) 51; 58 data symbols (Data) 52; 26 training symbols (TRS) 53; 58 data symbols (Data) 54; and 3 end symbols (TS) 55. In the solution of the invention, the symbol sequence of the reference signal is computed as a function of the training sequence 53 and the estimated impulse response of the channel, the function advantageously representing a convolution of said sequences.

In the following, the method of the invention is described as applied to the GSM system. Computing a momentary SNR for the channel comprises two essential steps: firstly, forming the reference signal YR from the estimated impulse response H of the channel and the training sequence TRS (the training symbols 53 of FIG. 5) advantageously as a convolution, and secondly; computing as a variance type computation the energy VAR of the noise from the reference signal YR and the training sequence Y received from the channel. Hence, the energy VAR of the noise is computed as a variance type computation, but the character in its nominator has no significance because it can easily be established and only has the purpose of operating as a scaler of the noise energy, which is easy to notice and correct at any stage of the computing process. By computing the convolution, the advantage is obtained that the reference signal YR is formed the same way as the actual signal on the channel, and by comparing the result to the signal received from the channel, noise can be estimated. When the noise energy VAR is computed as a variance from the reference signal YR and the signal received from the channel, the advantage is that the noise energy is obtained directly.

Due to the training sequence TRS being predetermined, it is possible to determine the momentary estimated impulse response H of the channel. Usually, the estimated impulse response H has 5 symbols, i.e. if there are N symbols, N=5 holds true. At the first phase of the method according to the invention, the reference signal YR is computed as a convolution of the channel estimated impulse response and the training sequence TRS using, for example, formula (1), the YR being the expected value of the training sequence TRS received at said estimated impulse response H.

$$YR(j) = \sum_{i=0}^{N-1} H(i) \cdot (1 - 2 \cdot TRS(j-i)) \quad (1)$$

in which N represents the number of symbols in the estimated impulse response H, and $j \geq N$ holds true for the symbol index j which indicates the symbol being computed. By going through the symbols j between N and 26, or the number of symbols in the predetermined sequence, the entire reference signal YR will be obtained. By utilizing the reference signal YR obtained and the signal Y received, which is the training sequence received, formula (2) is used for computing the variance type result VAR of these two.

$$VAR = \frac{\sum_{i=N}^{26} Re(Y(i+\text{offset}) - YR(i))^2 + Im(Y(i+\text{offset}) - YR(i))^2}{K} \quad (2)$$

In the formula (2), such a number of symbols are estimated that does not exceed the number of symbols in the predetermined sequence 53 minus the number of symbols in the channel estimated impulse response. This means that the number of symbols taken into account in the computing process can be chosen freely. The value of the variance type result in the formula (2) is the same as the energy noise per sample, if the divisor K is given a value which equals the number of symbols used in the summing, or the energy per the whole sequence, if the divisor K has the value 1. The value of the divisor K is insignificant as far as the solution of the invention is concerned, i.e. any number may be chosen to represent the value of the divisor K. Formula (2) uses denotations of I/Q modulation, whereby the symbols are denoted in their complex form. Formula (2) takes offset into account, the term referring to an advantageous transfer of the symbols of the signal received so that the symbol of the signal received corresponds with the symbol of the reference signal i.e. points to the correct place in the training sequence.

The energy of the signal received can be computed by means of either the channel estimated impulse response H or the reference signal YR. By computing the energy of the taps of the channel estimated impulse response H the advantage is gained that the signal energy $E_I$ per symbol is obtained. When the energy $E_{YR}$ is computed by means of the complex symbols obtained from the I/Q modulation of the reference signal, using e.g. formula (3)

$$E_{YR} = \sum_{i=N}^{26} Re(YR(i))^2 + Im(YR(i))^2 \quad (3)$$

it is possible to obtain the total energy of the reference signal directly. If the preprocessing means 24 is employed for forming a normalized average energy of the signal, corresponding to the energy $E_{YR}$, as in prior-art, it is not necessary to compute it separately.

The momentary SNR of the channel is obtained according to the principle shown in formula (4) by dividing the signal energy per symbol $E_I$ by the noise energy per symbol VAR, when the divisor K in the formula (2) is given a value corresponding with the number of symbols.

$$SNR = \frac{E_I}{VAR} \quad (4)$$

However, an advantageous method for computing the SNR is to divide the signal total energy $E_{YR}$ by the noise total energy VAR, when the divisor K in formula (2) has the value 1, according to formula (5) and therefore to avoid an extra dividing due to formulas (2) and (3) having in this case substantially the same number of elements to be summed.

$$SNR = \frac{E_{YR}}{VAR} \quad (5)$$

The SNR is advantageously computed separately for each burst because the communication quality may change rapidly even during a short period of time.

Signals originating from different diversity branches are combined in a diversity receiver, the combining taking place for example by summing or averaging, and, if desired, by multiplying the signals by a suitable constant. In the method of the invention, the signal is weighted by the SNR formed, or the signal for the detector is selected on the basis of the SNR information. The signal is applied to the detector after combining. The autocorrelation taps of the impulse response are also combined by, for example, summing or averaging or, if desired, by multiplying the outputs by a suitable constant. The autocorrelation taps of the impulse response are also weighted by the SNR. In combining the diversity branches and the autocorrelation taps, it is advantageous to combine only the bits or symbols that temporally correspond with one another. It is advantageous to combine the signals prior to detection, whereby a higher gain be obtained for the signal.

Although the invention is described above with reference to the examples in the accompanying drawings, it is obvious that the invention is not restricted thereto but it may be modified in various ways within the inventive idea of the attached claims.

What is claimed is:

1. A receiving method for a receiver (10–13) of a digital cellular radio system, the receiver employing Viterbi detection and diversity reception, the method involving forming an estimated impulse response of a channel, and the estimated impulse response of the channel as well as the predetermined sequence (53) comprised in the signal being symbol sequences, characterized by the steps of forming a reference signal from the estimated impulse response of the channel and the predetermined sequence (53) within the signal, computing as a variance type computation the energy of noise associated with the signal from the reference signal and the predetermined sequence (53) received from the channel, computing the SNR as a ratio between the reference signal energy and the noise energy, and combining the diversity branch symbols which temporally correspond with one another, and weighting the outputs of the adapted filters (25) in each branch and the autocorrelation taps in the impulse response by the SNR of each branch.

2. A method as claimed in claim 1, characterized in that the combining of the diversity branches takes place prior to the Viterbi detection.

3. A method as claimed in claim 1, characterized in that the reference signal is formed from the estimated impulse response of the channel and the predetermined sequence (53) by means of a convolution.

4. A method as claimed in claim 1, characterized by the computing of the channel noise energy taking into account such a number of symbols that does not exceed the number of symbols in the predetermined sequence (53) minus the number of symbols in the channel estimated impulse response.

5. A method as claimed in claim 1, characterized in that, in order to compute the channel noise energy, the offset between the reference signal and the predetermined sequence is corrected by shifting the symbols of the reference signal and the predetermined sequence with regard to one another so that the symbol of the signal received corresponds with the symbol of the reference signal.

6. A method as claimed in claim 1, characterized in that the energy of the reference signal is formed as a sum of the real parts of squares in the symbols within the signal.

7. A method as claimed in claim 1, characterized in that the energy of the reference signal is formed as the sum of squares of the taps in the channel estimated impulse response.

8. A method as claimed in claim 1, characterized in that if the transmission takes place in bursts, the SNR is computed separately for each burst received.

9. A method as claimed in claim 1 or 8, characterized in that the predetermined sequence (53) is a training sequence of a normal burst in the GSM system.

10. A receiver (10–13) of a digital radio system, the receiver comprising a Viterbi detection means (29), diversity branches and a means (26) for forming an estimated impulse response of the channel, characterized in that, in order to compute the SNR, the receiver (10–13) comprises a means (28*a*) used for forming the reference signal from the estimated impulse response of the channel and the predetermined sequence (53) within the signal, a means (28*b*) for computing the channel noise energy from the reference signal and the received predetermined sequence (53) as a variance type computation, a means (28*c*) for computing the SNR as a ratio between the reference signal energy and the energy of the noise, and diversity branches combining means (45, 46) which combine the temporally corresponding symbols of the different branches, and a means (28) for weighting the outputs of the adapted filters (25) in each branch and the autocorrelation taps in the impulse response by the SNR of each branch.

11. A receiver (10–13) as claimed in claim 10, characterized in that the diversity branches combining means (45 and 46) are located before the Viterbi detection means (29).

12. A receiver (10–13) as claimed in claim 10, characterized in that the receiver (10–13) comprises a means (28*a*) for forming the reference signal as a convolution of the channel estimated impulse response and the predetermined sequence (53).

13. A receiver (10–13) as claimed in claim 10, characterized in that the receiver (10–13) comprises a means (28*d*) for correcting the offset between the reference signal and the predetermined sequence (53).

* * * * *